United States Patent [19]

Aggers et al.

[11] Patent Number: 4,894,826
[45] Date of Patent: Jan. 16, 1990

[54] MESSAGE GENERATING COMMUNICATION APPARATUS HAVING A MESSAGE PREAMBLE FORMAT ALLOWING PARTS OF CERTAIN MESSAGES TO BE IGNORED

[75] Inventors: John R. Aggers, Apple Valley; Roger R. Roth, Minnetonka, both of Minn.

[73] Assignee: Honeywell, Inc., Minneapolis, Minn.

[21] Appl. No.: 303,417

[22] Filed: Jan. 30, 1989

[51] Int. Cl.[4] .............................................. H04J 3/16
[52] U.S. Cl. ................................... 370/85.1; 370/94.1; 370/13; 340/825.44; 340/825.52
[58] Field of Search ...................... 340/825.44, 825.20, 340/825.52, 825.50, 825.03; 370/79, 80, 81, 82, 83, 84, 94, 95, 60, 61, 13, 85; 371/67, 69

[56] References Cited

U.S. PATENT DOCUMENTS

| | | | |
|---|---|---|---|
| 4,027,153 | 5/1977 | Kach | 250/199 |
| 4,161,786 | 7/1979 | Hopkins et al. | 364/900 |
| 4,168,400 | 9/1979 | de Couasnon et al. | 179/15 BA |
| 4,357,700 | 11/1982 | Alvarez, III et al. | 370/83 |
| 4,410,889 | 10/1983 | Bryant et al. | 340/825.20 |
| 4,430,651 | 2/1984 | Bryant et al. | 340/825.52 |
| 4,451,827 | 5/1984 | Kahn et al. | 340/825.52 |
| 4,486,883 | 2/1982 | Kanai et al. | 371/67 |
| 4,517,669 | 5/1985 | Freeburg et al. | 370/82 |
| 4,538,263 | 8/1985 | Gabrielli et al. | 370/86 |
| 4,688,035 | 8/1987 | Gray et al. | 370/83 |
| 4,701,909 | 10/1987 | Kavehrad et al. | 370/85 |
| 4,760,572 | 7/1988 | Tomikawa | 370/94 |
| 4,789,986 | 12/1988 | Koizumi et al. | 371/67 |
| 4,792,944 | 12/1988 | Takahashi et al. | 370/84 |
| 4,800,559 | 1/1989 | Florea et al. | 370/94 |
| 4,802,240 | 1/1989 | Yamaguchi et al. | 340/825.44 |
| 4,815,071 | 3/1989 | Shimizu | 370/60 |

Primary Examiner—Donald J. Yusko
Assistant Examiner—Brian S. Palladino
Attorney, Agent, or Firm—Edward Schwarz

[57] ABSTRACT

A communication system has a first node which transmits on a data bus messages each having a preamble having a predetermined format including a message type and the message length, and a plurality of second nodes receiving messages from the data bus and including elements which can determine that the preamble in each message has the predetermined format. The preamble is particularly useful for allowing the second nodes to quickly detect messages not directed to those nodes of which the elements form a part, allowing the node to ignore the remainder of the message. This allows the individual nodes to exclude the message interpretation for detecting message directed to them, from their processing tasks thereby improving the effective processing speed of the network.

3 Claims, 2 Drawing Sheets

MESSAGE GENERATING COMMUNICATION APPARATUS HAVING A MESSAGE PREAMBLE FORMAT ALLOWING PARTS OF CERTAIN MESSAGES TO BE IGNORED

BACKGROUND OF THE INVENTION

Certain types of controllers comprise a network having individual control units or nodes each typically including a microprocessor as a component, where each node is connected with the others. It is convenient for the connection to be a two-conductor data bus to which all of the individual control units or nodes are connected. By using only two wires to connect all the nodes, the connections are dramatically simplified. However, when a simple two-conductor data bus is involved, it is not possible for more than one message to be sent concurrently. Messages are usually between pairs of nodes. Thus, when a large number of nodes are present on a network, most message traffic involves only a small percentage of the nodes present. The individual messages typically include information specifying, by its network address, the node to which it is directed.

The controllers comprising these nodes may typically be used to provide distributed control of a system having individual elements to be controlled throughout a building or a factory floor. For example (and the one for which the invention was devised), the nodes may be used to control a building environment by managing the heating, ventilating, and air conditioning functions for it. In such an application, the thermostats and other types of sensors are scattered over the entire building, and each must, at intervals from a few seconds to a few minutes, provide signals indicating the settings and conditions. Furthermore, the environment control apparatus may also have individual elements widely scattered, so it can be seen that both sensing and power devices can make use of controller apparatus whose individual elements can be widely dispersed.

In systems like this, the computing capacity of individual nodes is relatively small. Furthermore, since it is not possible in general to predict when a message will be directed to a particular node, each node must interpret every message in order to sense those directed to it. This is wasteful of scarce processing time. Accordingly, it is very useful to be able to identify where a message is directed, so that nodes to which it is not directed may resume their normal controlling function. It appears that perhaps as much as 15% of total microprocessor time in a node is devoted to such message interpretation. The sooner it can be determined that a message is not intended for a node, the sooner that node can start useful processing.

The use of check sums and other types of redundancy in electrically transmitted message used to increase the likelihood of accurate transmission has been known for probably as long as digital messages have been transmitted. The use to be described here is directed to reducing the processing time devoted to message interpretation rather than merely confirming the accuracy of the transmission.

SUMMARY OF THE INVENTION

A communications network system can devote substantially greater parts of its nodes' time to tasks other than message interpretation if the message can be determined at an early stage to not be directed to it. For example, if a message is a slave to master type message, then all other slaves need not perform message interpretation on the message. Such information can comprise one element of a preamble for every message. It is necessary to know approximately when the message will terminate of course, and this can be calculated from the message length value which may also be included in a field of the preamble. To add confidence that the particular digits of a message do in fact form a preamble, it is also reasonable to include an identification code in the preamble, and a check sum of the other parts of the preamble. Typically these digits will comprise individual 8-bit bytes.

Such a network may be of the type having a plurality of nodes all connected to a single data bus comprising an electrically conductive path, at least a first one of said nodes of the type for transmitting on the data bus to the other nodes electrical signals serially encoding a plurality of messages each comprising a variable number of digits, each digit of which occupies a predetermined time interval, some of said messages including destination node addresses and message codes; and a plurality of second nodes each having a unique network address, and each having a processing element and an input interface element, said input interface element selectively supplying or denying to the processing element the messages transmitted on the data bus by the first node accordingly as a digit interrupt disable signal received by it has respectively a first or second value, and responsive to equality between a destination node address within a message and a second node's network address, accepting the message and performing predetermined processing according to the message code, wherein the improvement comprises in each first node, preamble-generating apparatus for providing in each message sent by the node a preamble having a predetermined format signifying the presence of a message, comprising preamble generating means for providing a signal encoding the preamble and including in determined positions therein a sequence containing preselected preamble identification digits, a variable message type code having a first value specifying that the message is not directed to the second node, a message length value specifying the number of digits in the message, and a first redundancy value of a predetermined mathematical function of the numeric value of the preamble identification digits, the message type code, and the message length value; and wherein the improvement further comprises in each second node, apparatus receiving each message sent on the data bus, comprising (a) preamble-detecting means connected to the input interface element, for receiving from the input interface element the signals on the data bus from the first node, and (i) for testing successive digit sequences encoded therein for equality to the identification digits, (ii) for using preselected preamble identification digits, a message type code, and a message length value from the successive digit sequences encoded therein to calculate a second redundancy value using the predetermined mathematical function and for testing the second redundancy value equal to the first redundancy value from the successive digit sequences, and (iii) for testing the variable message type code for equality to its first value, and responsive to equality in all three tests for a specific sequence of successive digits, for providing a preamble present signal having a second value and the message length value within said specific sequence, the preamble present signal having a first value otherwise; and (b) timer means receiving the message length value and the preamble present signal from the preamble-detecting means for providing a digit interrupt disable signal to the input interface, said digit interrupt disable signal responsive to the preamble present signal having its second value for a duration corresponding to the message length value and its first value otherwise.

It should be understood that the elements of the invention as described above typically do not have independent or discrete existence. When these functions are realized in a microprocessor as in the preferred embodiment here, the individual elements are embodied in the read-only memory which provides the individual instruction controlling the operation of the microprocessor. Thus, the individual memory cells of the read-only memory, in connection with the microprocessor elements which execute these instructions, serve as the individual elements at the time that the function of the individual elements is required.

Accordingly, one purpose of this invention is to improve the processing efficiency of a communication network system.

Another purpose is to reduce the time spent interpreting messages to determine whether they are directed to a particular node.

Yet another purpose is to provide a preamble which allows detection of the presence of the start of a message.

DESCRIPTION OF THE PREFERRED EMBODIMENTS

Figures 1, 2:
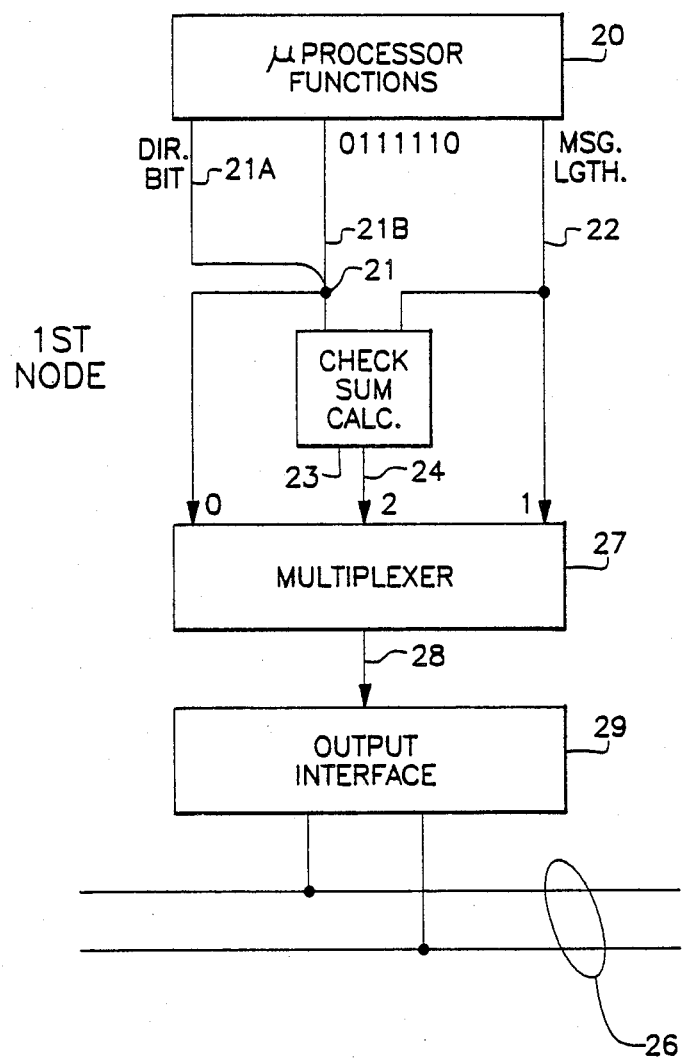
FIG. 1 illustrates the format for a message transmitted on the system on the network involved.
FIG. 2 is a functional block diagram of the message generation portion of a node.

In FIG. 1, the message whose format is shown there is of the type to be transmitted serially on a data bus. It is transmitted starting first with the bit at the left most end and followed by each bit in sequence throughout the message. The left most bit is the direction bit 10 which specifies that the message is directed to a master from a slave node when equal to 1, and from a master to a slave when equal to 0. This is immediately followed in sequence by the identification code bit pattern 0111110 shown in field 11. Bit 10 and the pattern of field 11 comprise the first 8-bit digit, or byte, of the message preamble. Message length field 12 contains a single byte which specifies the entire length of the message. Field 13 contains a check sum which is the two's complement sum of the byte comprising fields 10 and 11 and the byte comprising field 12. The remainder of the message may be of variable length, which length is specified by the value in message length field 12.

In FIG. 2, the elements forming the functional blocks shown form a portion of the microprocessor functions element 20. It is convenient to illustrate these separately for easier understanding of the invention. These elements can be considered to be a part of a first node. The blocks shown are used to generate the messages having the format shown in FIG. 1 and to transmit these messages serially on data bus 26. The microprocessor functions 20 generate the direction bit carried on path 21A, the identification code pattern on path 21B, and the message length of path 22. The direction bit path 21A and identification code pattern path 21B are combined into path 21 which, along with the path 22 carrying the message length, are provided as inputs to a check sum calculation function or element 23. The check sum is calculated by element 23 and provided on path 24 to the 2 input of multiplexer 27. The direction bit/identification code signal on path 21 provides the 0 input to multiplexer 27, and the message length signal on path 22 provides the 1 input to multiplexer 27.

Multiplexer 27 is designed to sequentially gate the bit pattern carried on path 21, then on path 22, and then on path 24 to its output path 28. Output path 28 is provided to the input of an output interface element 29, typically separate from the microprocessor functions 20 which have been described previously with respect to FIG. 2. Output interface 29 converts the bytes sequentially received on path 28 into serial waveform signals applied to data bus 26.

Figure 3:
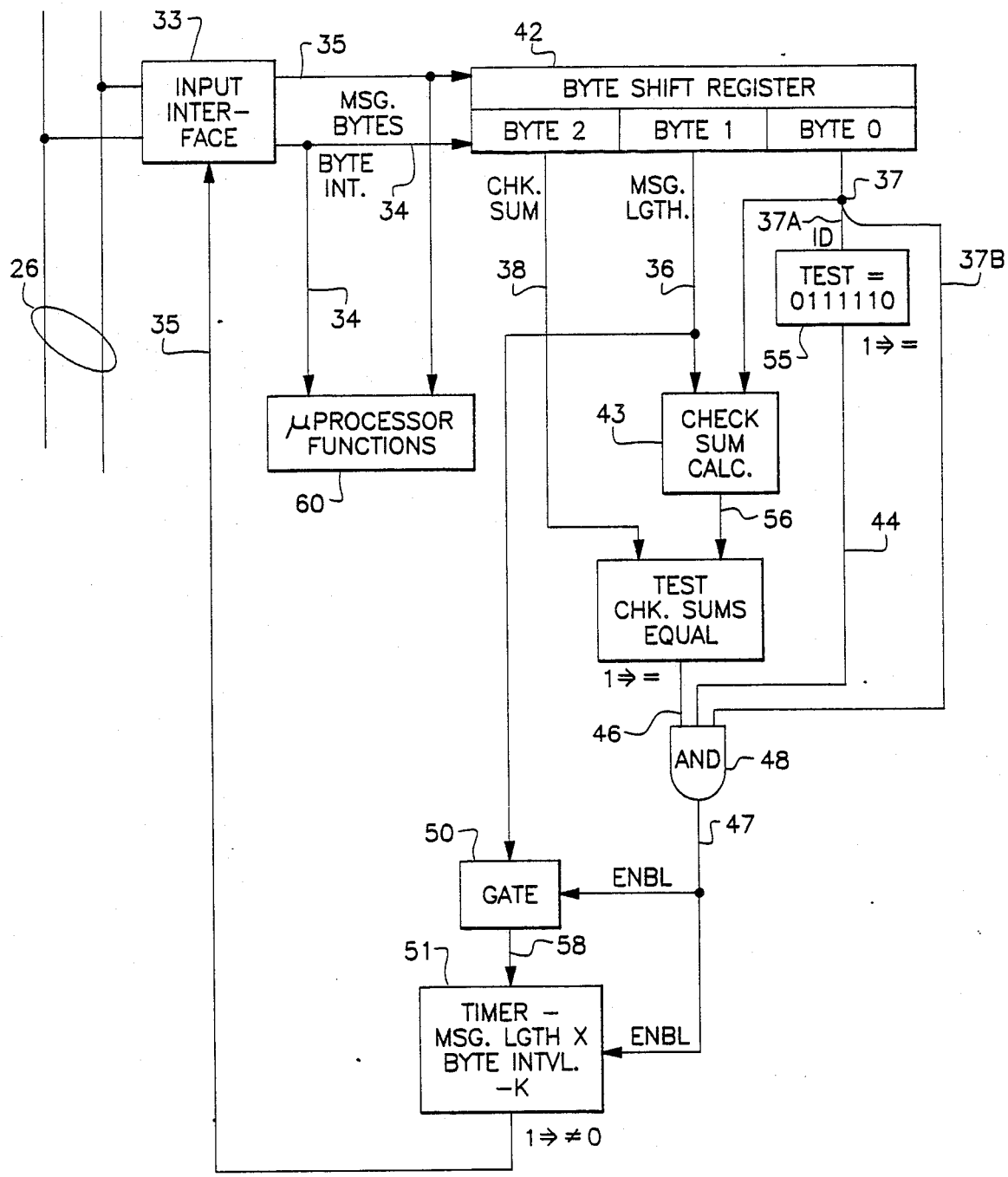
FIG. 3 is a functional block diagram of the output functions of a microprocessor involving this invention.

In FIG. 3, the input interface 33 shown therein receives the signals on path 26 provided by the first node, different from the second node of which input interface 33 forms a part, although frequently every node in a network will contain the elements of both FIGS. 2 and 3. Input interface 33 receives the serial waveform and converts the bits encoded therein into individual bytes precisely duplicating the individual byte sequence in the original message. These message bytes are provided in sequence on path 35 to a byte shift register 42.

Byte shift register 42 is of the type which, at any time during its operation, contains three bytes. As each message byte is presented to it on path 35, a byte interrupt carried on path 34, and also provided by input interface 33, causes byte shift register 42 to transfer the contents in its byte 1 portion to byte 0, then to transfer the contents of its byte 2 portion to byte 1, and then to transfer the message byte on path 35 into the byte 2 portion. It should be understood that register 42 as well as the remaining elements in FIG. 3 to be discussed are a part of a microprocessor.

After this shifting of bytes has occurred, then a three-part test is performed on these three bytes. Byte 0 contents are carried on path 37 to a check sum calculator element 43. In addition, the lower order 7 bits of byte 0 are carried on path 37A to a test element 55 which tests these seven bits for equality to the bit pattern 0111110 as shown. The stylized arrow shows that Boolean 1 output implies equality in this test. The high order bit of byte 0 is carried on path 37B and forms one input to AND gate 48.

The contents of byte 1 is carried on path 36 and forms a second input to check sum calculator element 43. The contents of byte 2 of byte shift register is carried on path 38 and is applied as one input to a check sum test element 45. A second input to check sum test element 45 is provided on path 56 from check sum calculator element 43. Check sum test element 45 provides a Boolean 1 output on path 46 if equality between the two inputs to check sum comparison element 45 (on paths 38 and 56) is detected.

AND gate 48 receives the signals which specify the results of the tests formed by test elements 45 and 55, and the direction bit on path 37B. If all three inputs have the Boolean 1 value, then an output from AND gate 48 on path 47 will also have a Boolean 1 value.

A gate 50 receives the contents of byte 1 of register 42 in byte shift register 42 and transits this value on path 58 to timer 51. A Boolean 1 signal is present on path 47 which enables gate 50 and transmits the contents of byte 1 to path 58.

Timer 51 receives the contents of byte 1 from byte shift register 42 under the described circumstances and, in response to a Boolean 1 on path 47, calculates a time value which is equal to the actual value contained in byte 1 times the predetermined byte interval, i.e. the time required to transmit one byte on data bus 26, and subtracts a constant value K from this. Timer 51 is enabled by the Boolean 1 level on path 47 to begin timing for an interval equal to the length specified by the calculation described. While so timing, the output of timer 51 is set to a Boolean 1. At all other times, the output of timer 51 is a Boolean 0.

Input interface 33 further can be disabled from generating byte interrupts on path 34 whenever the disable byte interrupt signal on path 35 is a Boolean 1. While the signal on path 35 is a Boolean 1, no further message bytes can be detected on path 35 by byte shift register 42 or by the other microprocessor functions symbolized by element 60 because the byte interrupt signal is absent.

EXPLANATION

It can be seen that every individual sequence of three successive bytes in a message will, at some time, occupy bytes 0, 1, and 2 of byte shift register 42. If, at any time, the configuration of these bytes is such that the three tests described, i.e. direction bit equal to Boolean 1 (path 37B), identification pattern in byte 0 equal to 0111110 (test element 55), and the sum of bytes 0 and 1 in byte shift register (calculator element 43 and test element 45) is equal to the contents of byte 2, then the message length value in byte 1 will be transmitted to timer 51, and the microprocessor functions elements 60 will no longer recover byte interrupts until the timer again sets its output to a Boolean 0.

As mentioned earlier, the processing time which is required to interpret individual messages to determine whether they are directed to a particular second node or not is not inconsiderable. By disabling byte interrupts once it has been determined by the analysis of the preamble contained in byte shift register 42, then the operation of the elements described disables the further interpretation of message bytes, allowing microprocessor functions element 60 to proceed with other tasks without diverting any of its time to message interpretation or processing. Timer 51 re-enables input interface 33 to provide byte interrupts on path 34 in time so that all message bytes at the start of the next message will be available to byte shift register 42. If the direction bit carried on path 37B indicates that this next message may perhaps be directed to this node, then the byte interrupts will continue to be provided on path 34 to it and processing continues in the customary fashion.

In this way, processor efficiency can be substantially enhanced without any great risk of missing messages intended for a particular node.

The embodiments of the invention in which an exclusive property or right is claimed are defined as follows:

1. In a communications network system of the type having a plurality of nodes all connected to a single data bus comprising an electrically conductive path, at least a first one of said nodes of the type for transmitting on the data bus to the other nodes electrical signals serially encoding a plurality of messages each comprising a variable number of digits, each digit of which occupies a predetermined time interval, some of said messages including destination node addresses and message codes; and a plurality of second nodes each having a unique network address, and each having a processing element and an input interface element, said input interface element selectively supplying or denying to the processing element the messages transmitted on the data bus by the first node accordingly as a byte interrupt disable signal received by said interrupt interface element has respectively a first or second value, and responsive to equality between a destination node address within a message and a second node's network address, accepting the message and performing predetermined processing according to the message code, wherein the improvement comprises in each first node, preamble-generating apparatus for providing in each message sent by the node a preamble having a predetermined format signifying the presence of a message, comprising preamble generating means for providing a signal encoding the preamble and including in determined positions therein a sequence containing preselected preamble identification digits, a variable message type code which may have a plurality of values, the first of which specifying that the message is not directed to the second node, a message length value specifying the number of digits in the message, and a first redundancy value of a predetermined mathematical function of the numeric value of the preamble identification digits, the message type code, and the message length value; and wherein the improvement further comprises in each second node, apparatus receiving each message sent on the data bus, comprising (a) preamble-detecting means connected to the input interface element, for receiving from the input interface element the signals on the data bus from the first node, and (i) for testing successive digit sequences encoded therein for equality to the identification digits, (ii) for using preselected preamble identification digits, a message type code, and a message length value from the successive digit sequences encoded therein to calculate a second redundancy value using the predetermined mathematical function and for testing the second redundancy value equal to the first redundancy value from the successive digit sequences, and (iii) for testing the variable message type code for equality to its first value, and responsive to equality in all three tests for a specific sequence of successive digits, for providing a preamble present signal having a second value and the message length value within said specific sequence, the preamble present signal having a first value otherwise; and (b) timer means receiving the message length value and the preamble present signal from the preamble-detecting means for providing a digit interrupt disable signal to the input interface, said digit interrupt disable signal responsive to the preamble present signal having its second value for a duration corresponding to the message length value and its first value otherwise.

2. The communications network system of claim 1, wherein the timing means includes means for providing the digit interrupt signal second value for a duration not exceeding the product of the message length value and the predetermined digit interval.

3. The communications network system of claim 1, wherein the timing means includes means for providing the digit interrupt signal second value for a duration not exceeding the product of the message length value and the predetermined digit interval less a constant time interval.

* * * * *